(12) United States Patent
Lu et al.

(10) Patent No.: US 11,760,044 B2
(45) Date of Patent: Sep. 19, 2023

(54) METHOD AND APPARATUS FOR MANUFACTURING AN INTEGRATED HULL BY USING THREE-DIMENSIONAL STRUCTURE TYPE FIBER CLOTHES AND A THREE-DIMENSIONAL VACUUM INFUSION PROCESS

(71) Applicant: Atech Composites Co., Ltd., Kaohsiung (TW)

(72) Inventors: Chia-Yang Lu, Kaohsiung (TW); Kai-Lin Chen, Kaohsiung (TW); Chu-Sung Hung, Kaohsiung (TW); Yu-Lin Chan, Kaohsiung (TW); Ming-Wu Yang, Kaohsiung (TW)

(73) Assignee: ATECH COMPOSITES CO., LTD., Kaohsiung (TW)

(*) Notice: Subject to any disclaimer, the term of this patent is extended or adjusted under 35 U.S.C. 154(b) by 320 days.

(21) Appl. No.: 16/925,971

(22) Filed: Jul. 10, 2020

(65) Prior Publication Data

US 2021/0323253 A1     Oct. 21, 2021

(30) Foreign Application Priority Data

Apr. 21, 2020   (TW) .................................. 109113367

(51) Int. Cl.
 *B29C 70/34*     (2006.01)
 *B29C 70/44*     (2006.01)
       (Continued)

(52) U.S. Cl.
 CPC .............. *B29C 70/70* (2013.01); *B29C 70/12* (2013.01); *B29C 70/342* (2013.01);
       (Continued)

(58) Field of Classification Search
 CPC ....... B29C 70/12; B29C 70/30; B29C 70/342; B29C 70/36; B29C 70/44; B29C 70/443;
       (Continued)

(56) References Cited

U.S. PATENT DOCUMENTS 6,367,406 B1 * 4/2002 Sahr ....................... B29C 70/48
                                                       114/357
8,449,804 B2 * 5/2013 Schibsbye ............. B29C 70/543
                                                       264/257

(Continued)

FOREIGN PATENT DOCUMENTS

WO    WO-2018007569 A1 *  1/2018  ............. B29B 7/005

*Primary Examiner* — Michael A Tolin
(74) *Attorney, Agent, or Firm* — WPAT, P.C (57) ABSTRACT

A method for manufacturing an integrated hull by using 3D structure type fiber clothes and 3D vacuum infusion process includes: sequentially stacking at least one first fiber cloth, at least one core material and at least one second fiber cloth on a mold; deploying structural materials on the second fiber cloth; stacking the third fiber clothes to cover the structure materials and a part of the second fiber cloth, whereby the first fiber cloth, the core material, the second fiber cloth and the third fiber clothes are formed to a lamination; determining a pipe arrangement of vacuum pipes and first and second resin pipes; deploying a vacuum bag on the lamination and covering the first and second resin pipes and the vacuum pipe; executing the 3D vacuum infusion process; curing the resin; and executing a mold release process to complete an integrated hull.

5 Claims, 8 Drawing Sheets

(51) Int. Cl.
  *B63B 5/00* (2006.01)
  *B29C 70/70* (2006.01)
  *B32B 5/02* (2006.01)
  *B32B 5/26* (2006.01)
  *B32B 5/18* (2006.01)
  *B32B 5/24* (2006.01)
  *B32B 21/10* (2006.01)
  *B29C 70/12* (2006.01)
  *B32B 3/30* (2006.01)
  *B29C 70/54* (2006.01)
  *B29K 105/20* (2006.01)
  *B29L 31/30* (2006.01)
  *B29K 309/08* (2006.01)
  *B29K 711/14* (2006.01)
  *B29K 105/12* (2006.01)

(52) U.S. Cl.
  CPC .............. *B29C 70/546* (2013.01); *B32B 3/30* (2013.01); *B32B 5/02* (2013.01); *B32B 5/18* (2013.01); *B32B 5/245* (2013.01); *B32B 5/26* (2013.01); *B32B 21/10* (2013.01); *B63B 5/00* (2013.01); *B29K 2105/12* (2013.01); *B29K 2105/20* (2013.01); *B29K 2309/08* (2013.01); *B29K 2711/14* (2013.01); *B29K 2715/003* (2013.01); *B29L 2031/307* (2013.01); *B32B 2262/101* (2013.01); *B32B 2605/12* (2013.01); *B63B 2231/50* (2013.01); *B63B 2231/52* (2013.01)

(58) Field of Classification Search
  CPC ....... B29C 70/446; B29C 70/48; B29C 70/54; B29C 70/541; B29C 70/544; B29C 70/546; B29C 70/547; B29C 70/548; B29C 70/68; B29C 70/681; B29C 70/682; B29C 70/70; B29C 70/865; B29D 99/0014; B29D 99/0021; B29K 2105/12; B29K 2105/20; B29K 2309/08; B29K 2711/14; B29K 2715/003; B29L 2031/3067; B29L 2031/307; B32B 3/08; B32B 3/30; B32B 5/02; B32B 5/18; B32B 5/245; B32B 5/26; B32B 21/10; B32B 2250/40; B32B 2260/023; B32B 2260/046; B32B 2262/101; B32B 2605/12; B63B 5/00; B63B 5/24; B63B 2005/242; B63B 2005/247; B63B 73/70; B63B 2231/50; B63B 2231/52
  See application file for complete search history.

(56) References Cited

U.S. PATENT DOCUMENTS

| | | | |
|---|---|---|---|
| 2004/0146714 A1* | 7/2004 | McCollum | B29C 70/086 428/411.1 |
| 2008/0163810 A1* | 7/2008 | Mataya | B29C 70/548 114/357 |
| 2008/0182054 A1* | 7/2008 | Ridges | B29C 70/44 264/308 |

* cited by examiner

METHOD AND APPARATUS FOR MANUFACTURING AN INTEGRATED HULL BY USING THREE-DIMENSIONAL STRUCTURE TYPE FIBER CLOTHES AND A THREE-DIMENSIONAL VACUUM INFUSION PROCESS

CROSS-REFERENCE TO RELATED APPLICATION

This application claims the benefit of Taiwan Patent Application No. 109113367, filed on Apr. 21, 2020, which is hereby incorporated by reference for all purposes as if fully set forth herein.

BACKGROUND

Technical Field

The present disclosure relates to method and apparatus for manufacturing an integrated hull, and in particular, to method and apparatus for manufacturing an integrated hull that is integrated with structural materials in one shot by using three-dimensional structure type fiber clothes and a three-dimensional vacuum infusion process.

Related Art

The production of high value added yachts is often accompanied by a cutting edge technology. Due to the stricter requirements on the surface quality of the finished yacht product, the yacht industry spends a lot of time and cost to achieve high-spec surface quality of the boat hull.

The forming concept of the composite material made yacht hull is mainly made by lamination, which is achieved by stacking multiple layers of glass fiber clothes (e.g., Woven Roving or Chopped Strand Mat or stitched fabric or combi-mat). The main hand lay-up process is to apply resin successively, attach fiber clothes, and use tools such as brushes, rollers, scrapers to impregnate glass fiber clothes with the resin without wrinkling or leaving bubbles.

At present, the vacuum infusion process, such as Vacuum Assisted Resin Transfer Molding (VARTM), can complete the arrangement of fiber clothes and core material, and then the resin is led into internal space of the fiber clothes by the negative pressure of vacuum, so as to make a boat hull. However, the conventional manufacturing method of the boat hull still adopts the hand lay-up process after the vacuum infusion process, and the structural materials are bonded on the boat hull body by the secondary bonding. Thus, the structural performance of the entire finished boat hull is poor, and the weight is also heavier because of using the hand lay-up process for the secondary bonding.

Therefore, method and apparatus for manufacturing an integrated hull that is integrated with structural materials in one shot needs to be provided, to resolve the foregoing problem.

SUMMARY

An objective of the present disclosure is to provide method and apparatus for manufacturing an integrated hull by using three-dimensional structure type fiber clothes and a three-dimensional vacuum infusion process.

To achieve the foregoing objective, the present disclosure provides a method for manufacturing an integrated hull by using three-dimensional structure type fiber clothes and a three-dimensional vacuum infusion process, the method including the steps of: providing a mold, comprising a cavity; sequentially stacking at least one layer of first fiber cloth, at least one layer of core material and at least one layer of second fiber cloth on the surface of the cavity of the mold; deploying longitudinal and transverse structural materials on the second fiber cloth; stacking several layers of third fiber clothes to cover the longitudinal and transverse structural materials and a part of the second fiber cloth, whereby the first fiber cloth, the core material, the second fiber cloth and the third fiber clothes are formed to a lamination, wherein the first fiber cloth, the second fiber cloth and the third fiber clothes are the three-dimensional structure type fiber clothes and have internal space of three-dimensional structure; determining a pipe arrangement of vacuum pipes and first and second resin pipes according to the lamination design and a resin flow status, wherein suction holes of the vacuum pipes are deployed at positions of two sides of the mold, injection holes of the first resin pipes are deployed at a middle position of the mold, and injection holes of the second resin pipes are deployed between the injection holes of the first resin pipes and the suction holes of the vacuum pipes; deploying a layer of vacuum bag on the lamination and covering the first and second resin pipes and the vacuum pipe, wherein a laying range of the vacuum bag can completely cover a laying range of the third fiber clothes and seal the mold; executing the three-dimensional vacuum infusion process, wherein: the vacuum pipes are used to generate a vacuum suction force on the two sides of the mold, and the first and second resin pipes are used to sequentially inject a resin and fill the resin in the internal space of the lamination; curing the resin, so as to form an integrated hull covering the longitudinal and transverse structural materials; and executing a mold release process, wherein: the vacuum bag, the vacuum pipes, and the first and second resin pipes are removed respectively, and the integrated hull is separated from the mold.

The present disclosure further provides an apparatus for manufacturing an integrated hull by using three-dimensional structure type fiber clothes and a three-dimensional vacuum infusion process, the apparatus including: a mold, wherein at least one layer of first fiber cloth, at least one layer of core material and at least one layer of second fiber cloth are stacked sequentially on the surface of a cavity of the mold, the longitudinal and transverse structural materials are deployed on the second fiber cloth, several layers of third fiber clothes are stacked to cover the longitudinal and transverse structural materials and a part of the second fiber cloth, whereby the first fiber cloth, the core material, the second fiber cloth and the third fiber clothes are formed to a lamination, wherein the first fiber cloth, the core material, the second fiber cloth and the third fiber clothes are three-dimensional structure type fiber clothes and have internal space of three-dimensional structure; vacuum pipes, wherein suction holes of the vacuum pipes are deployed at positions of two sides of the mold; first and second resin pipes, wherein injection holes of the first resin pipes are deployed at a middle position of the mold, and injection holes of the second resin pipes are deployed between the injection holes of the first resin pipes and the suction holes of the vacuum pipes; a layer of vacuum bag is deployed on the lamination and covering the first and second resin pipes and the vacuum pipe, wherein a laying range of the vacuum bag can completely cover a laying range of the third fiber clothes and seal the mold; and a three-dimensional vacuum infusion device, wherein the vacuum pipes are used to generate a vacuum suction force on the two sides of the mold, and the first and second resin pipes are used to sequentially inject a resin and fill the resin in the internal space of the lamination, the resin is cured, so as to form an integrated hull covering the longitudinal and transverse structural materials.

The present disclosure further provides an integrated hull, including: at least one layer of first fiber cloth, at least one layer of core material and at least one layer of second fiber cloth stacked sequentially; longitudinal and transverse structural materials deployed on the second fiber cloth; several layers of third fiber clothes stacked to cover the longitudinal and transverse structural materials and a part of the second fiber cloth, whereby the first fiber cloth, the core material, the second fiber cloth and the third fiber clothes are formed to a lamination, wherein the first fiber cloth, the second fiber cloth and the third fiber clothes are three-dimensional structure type fiber clothes and have an internal space of three-dimensional structure; and a resin filled in the internal space of the lamination, so as to form an integrated hull covering the longitudinal and transverse structural materials.

The present disclosure is characterized in that: the three-dimensional vacuum infusion process of the manufacturing method of the integrated hull of the present disclosure is to use the pressure difference between the atmosphere and the vacuum to allow the resin to flow into the mold, fill the internal space of the lamination, and cover the vertical and horizontal structural materials, thereby greatly avoiding the volatilization of volatile organic compounds in the conventional hand lay-up process; moreover, the present disclosure can increase the fiber content, reduce the amount of resin, and then reduce the weight. Compared with the conventional manufacturing method of the boat hull, which still adopts the hand lay-up process (the structural materials are bonded on the boat hull body by the secondary bonding) after the vacuum infusion process, the manufacturing method of the integrated hull of the present disclosure can avoid the secondary bonding manner of the structural material, thereby avoiding the risk of bonding failure of the structural material and the poor structural performance of a boat hull, and can shorten the production period.

DETAILED DESCRIPTION

To make the objectives, features, and characteristics of the present disclosure clearer and easier to understand, the following gives a detailed description of related embodiments of the present disclosure with reference to the accompanying drawings.

Figure 1:
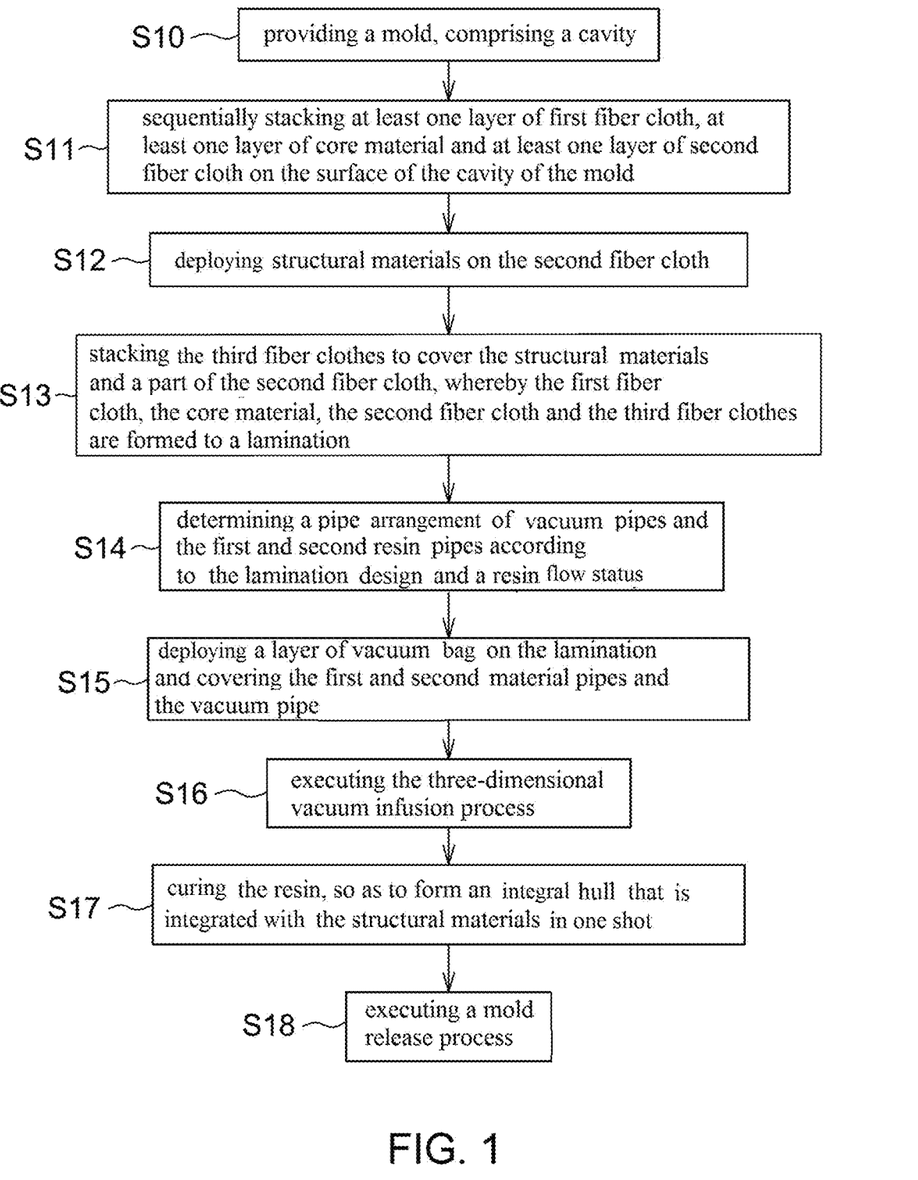
FIG. 1 is a flow chart of a method for manufacturing an integrated hull according to an embodiment of the present disclosure.
Figure 2:
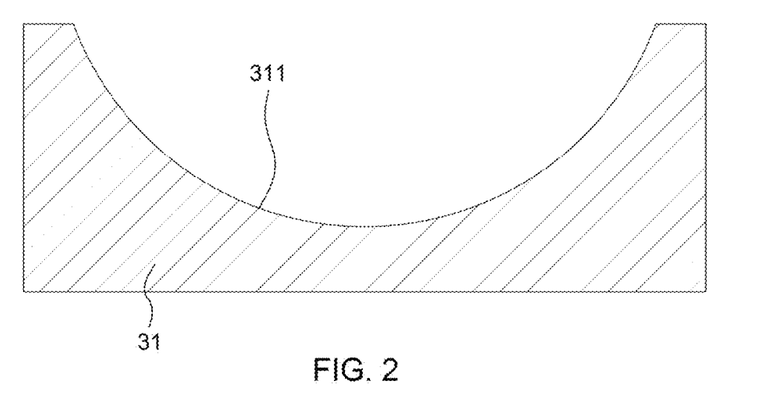
FIG. 2 is a schematic sectional view of a method for manufacturing an integrated hull according to an embodiment of the present disclosure, showing that a mold is provided.

Please refer to FIG. 2. In step S10, a mold 31 is provided. The mold 31 includes a cavity 311. The cavity 311 is a part of shape of a subsequent hull. The material of the mold 31 can be fiber-reinforced plastic (FRP). For example, using a five-axis milling machine to make a mold, the making process can include four steps. The first step is that: the five-axis milling machine performs cutting of 100K high-density foam blocks to complete the processing of the mold body. The second step is that: the glass fiber layers are laminated on the surface of the mold to improve the strength and hardness of the mold. The third step is that: the surface of the mold is filled with putty and smoothed. The fourth step is that: the mold surface is sprayed with a tooling gel coat to complete the mold production.

Figure 3:
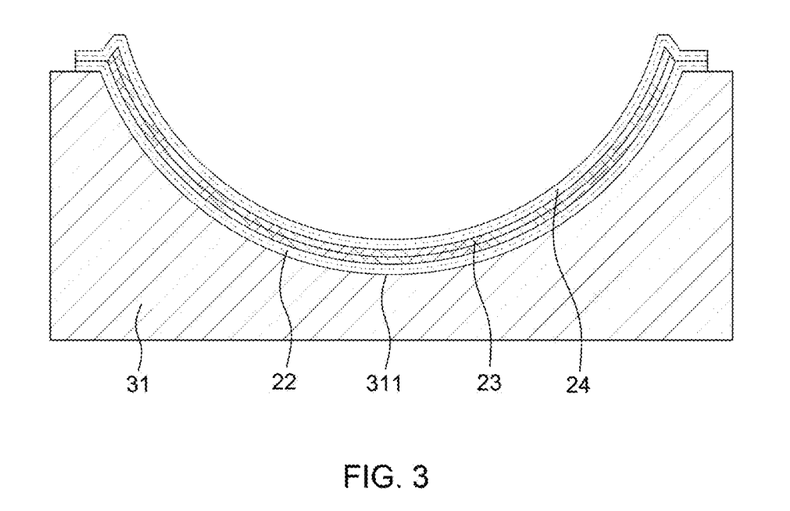
FIG. 3 is a schematic sectional view of a method for manufacturing an integrated hull according to an embodiment of the present disclosure, showing that at least one layer of first fiber cloth, at least one layer of core material and at least one layer of second fiber cloth are stacked sequentially on the surface of a cavity of the mold.

Please refer to FIG. 3. In step S11, at least one layer of first fiber cloth 22, at least one layer of core material 23 and at least one layer of second fiber cloth 24 are stacked sequentially on the surface of the cavity 311 of the mold 31, wherein the first fiber cloth 22 and the second fiber cloth 23 have internal space of three-dimensional structure. The material of the core material 23 can be a foam material or a wood material, and the material of the first fiber cloth 22 can be glass fiber.

Figure 4:
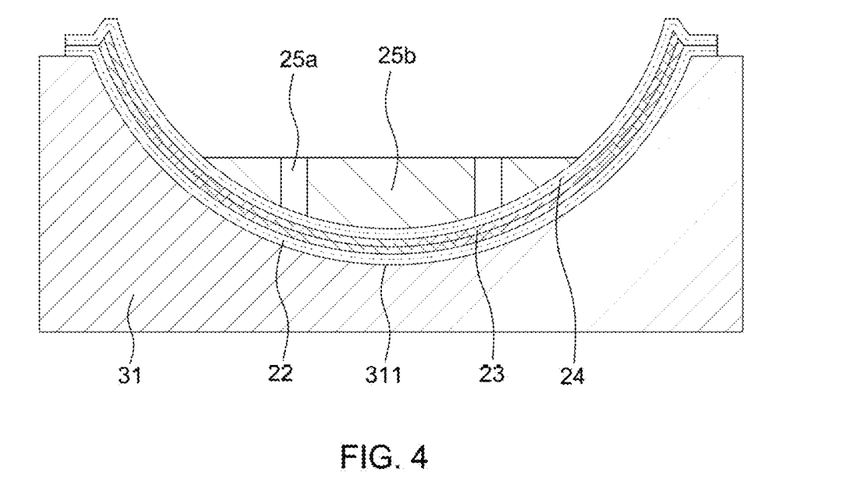
FIG. 4 is a schematic sectional view of a method for manufacturing an integrated hull according to an embodiment of the present disclosure, showing that a plurality of longitudinally and transversely structural materials are deployed on the second fiber cloth.
Figure 5:
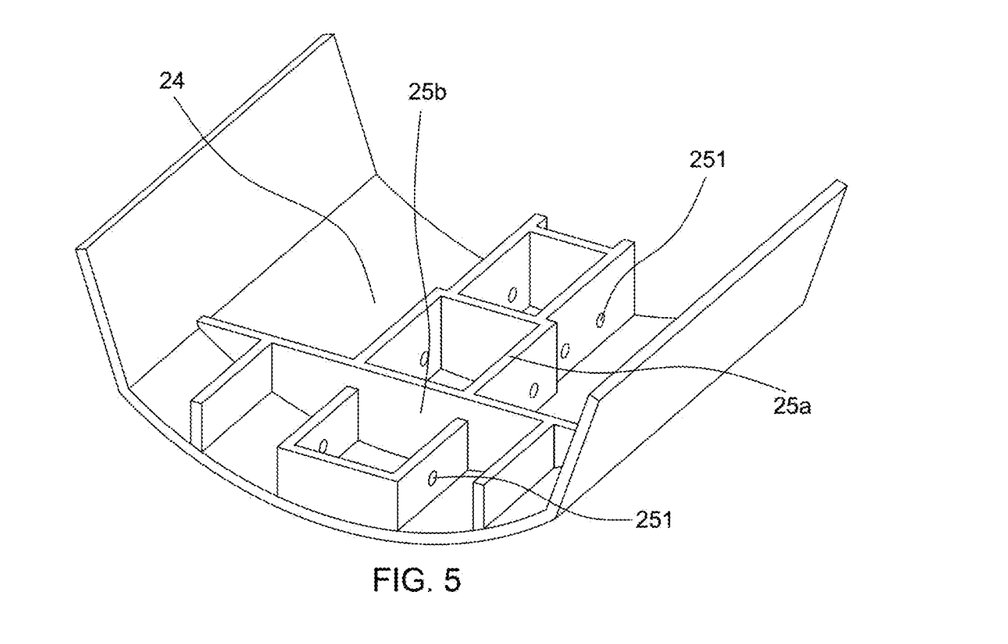
FIG. 5 is a schematic partial perspective sectional view of longitudinal and transverse structural materials according to an embodiment of the present disclosure.

Please refer to FIGS. 4 and 5. In step S12, longitudinal and transverse structural materials 25a, 25b are deployed on the second fiber cloth 24. The material of the longitudinal and transverse structural materials 25a, 25b is Polyurethane (PU) foam material. In this step, the reserved holes 251 formed by the longitudinal and transverse structural materials 25a, 25b can be treated for the pipeline to pass through in the future.

Figure 6:
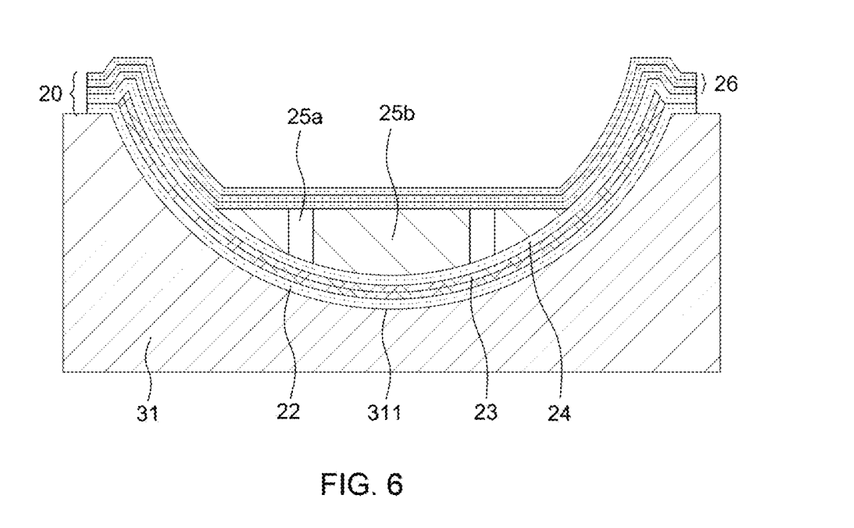
FIG. 6 is a schematic sectional view of a method for manufacturing an integrated hull according to an embodiment of the present disclosure, showing that several layers of third fiber clothes are stacked to cover the longitudinal and transverse structural materials and a part of the second fiber cloth.

Please refer to FIG. 6. In step S13, the third fiber clothes 26 are stacked to cover the longitudinal and transverse structural materials 25a, 25b and a part of the second fiber cloth 24, whereby the first fiber cloth 22, the core material 23, the second fiber cloth 24 and the third fiber clothes 26 are formed to a lamination 20, wherein the third fiber clothes also have internal space of three-dimensional structure. For example, the first fiber cloth 22, the core material 23 and the third fiber clothes 26 of the present disclosure can be chosen to use three-dimensional structure type fiber clothes, e.g., product of High Flow, G Flow™, Vector Fusion™ made from companies of Vitrulan, CHOMARAT, Vectorply, etc.

Figure 7A:
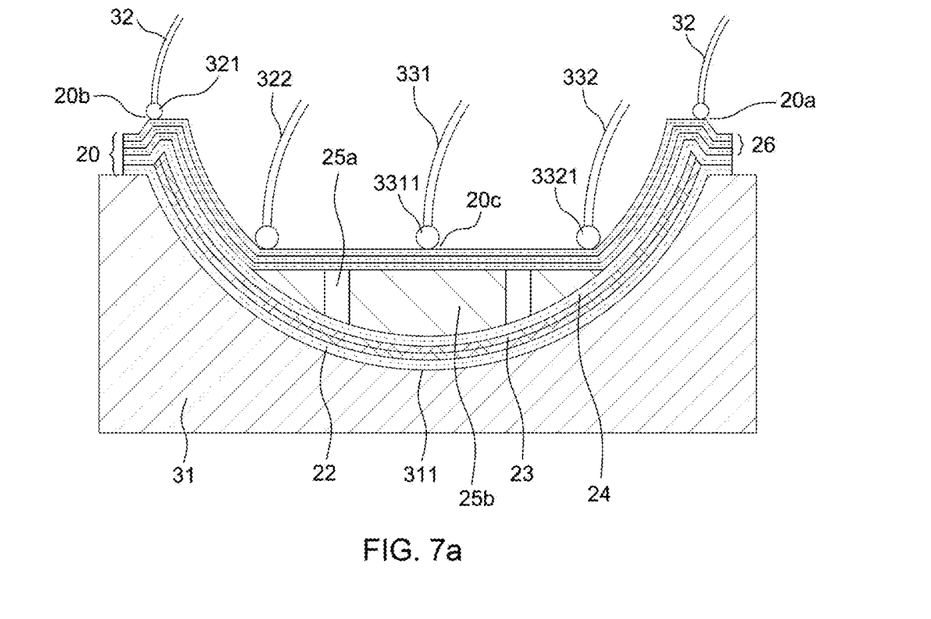
FIG. 7a is a schematic sectional view of a method for manufacturing an integrated hull according to an embodiment of the present disclosure, showing that a pipe arrangement of vacuum pipes and the first and the second resin pipes is determined.
Figure 7B:
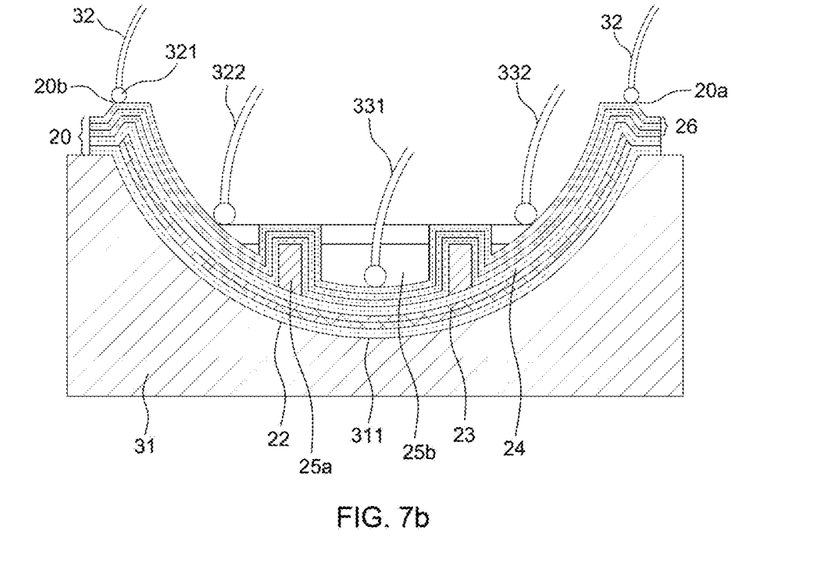
FIG. 7b is another schematic sectional view of a method for manufacturing an integrated hull according to an embodiment of the present disclosure, showing that a pipe arrangement of vacuum pipes and the first and the second resin pipes is determined.

Please refer to FIGS. 7a and 7b. In step S14, a pipe arrangement of a plurality of vacuum pipes 32 and first and second resin pipes 331, 332 is determined according to the lamination design and a resin flow status, wherein suction holes 321 of the vacuum pipes 32 are deployed at positions of two sides 20a, 20b of the lamination 20, injection holes 3311 of the first resin pipes 331 are deployed at a middle position 20c of the lamination 20, and injection holes 3321 of the second resin pipes 332 are deployed between the injection holes 3311 of the first resin pipes 331 and the suction holes 321 of the vacuum pipes 32. The numbers of the first resin pipes 331 and the second resin pipes 332 shown in FIGS. 7a and 7b are not intended to limit the present disclosure; for large components, more resin pipes are required for the pipe arrangement. The pipe arrangement refers to that the suction holes 321 of the vacuum pipes 32 connect to the internal space of the lamination 20 to provide the vacuum suction force; and the injection holes 3311, 3321 of the first and second resin pipes 331, 332 connect to the internal space of the lamination 20, whereby the first and second resin pipes 331, 332 sequentially inject the resin according to the resin flow status. According to the present disclosure, the technology that was originally limited to the 2D flow of the resin is refined to a technology that can be controlled to the 3D flow of the resin up and down.

Figure 8:
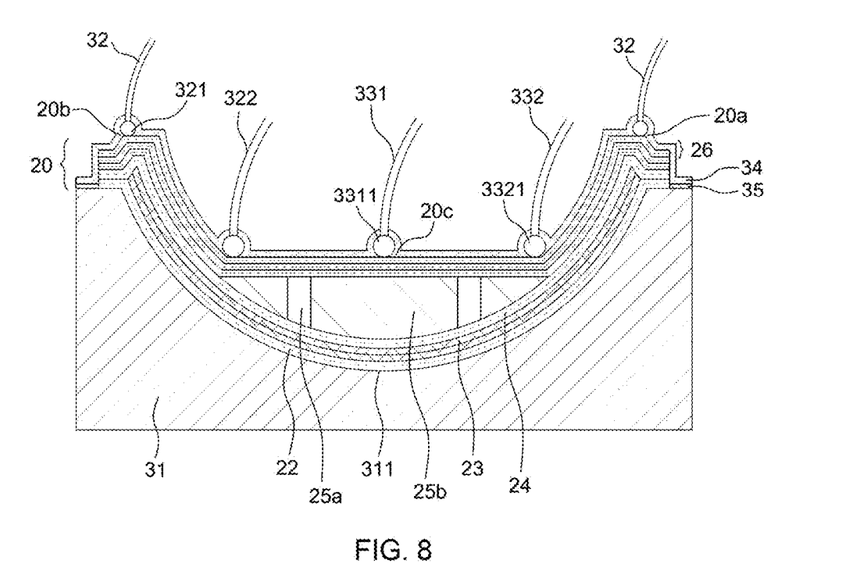
FIG. 8 is a schematic sectional view of a method for manufacturing an integrated hull according to an embodiment of the present disclosure, showing that a layer of vacuum bag is deployed on the lamination.

Please refer to FIG. 8. In step S15, a layer of vacuum bag 34 is deployed on the lamination 20 and covering the first and second resin pipes 331, 332 and the vacuum pipes 32, wherein a laying range of the vacuum bag 34 can completely cover a laying range of the third fiber clothes 26 and seal the mold 31. In order to increase the sealing performance of the vacuum bag 34 and the third fiber clothes 26, the vacuum bag 34 is attached to the mold 31 with a sealant tape 35 located around the third fiber clothes 26.

Figure 9:
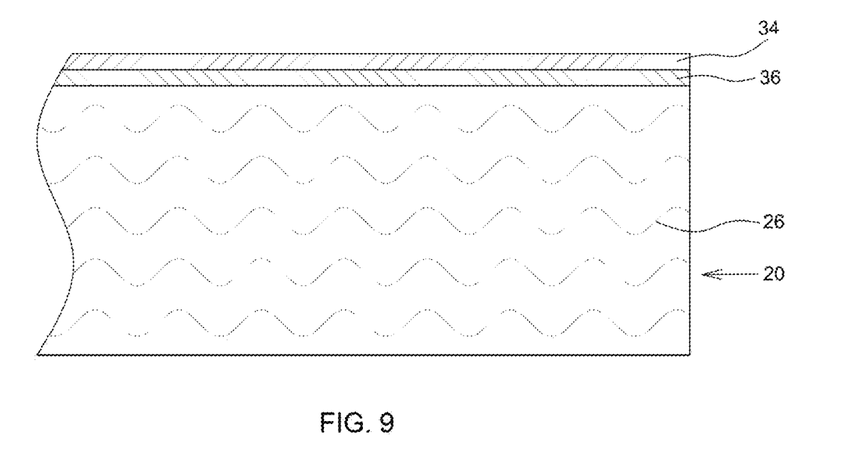
FIG. 9 is a schematic sectional view of a method for manufacturing an integrated hull according to an embodiment of the present disclosure, showing that a vacuum consumable layer is located between the vacuum bag and the third fiber clothes.

Please refer to FIG. 9. Before the step of deploying the vacuum bag 34, a layer of vacuum consumable layer 36 is deployed on the third fiber clothes 26 and covers the range of the third fiber clothes 26 according to the requirements of the lamination 20, whereby the vacuum consumable layer 36 is located between the vacuum bag 34 and the third fiber clothes 26. The vacuum consumable layer 36 can include peel ply, release film and flow mesh which are used sequentially to helps the resin flow.

Figure 10A:
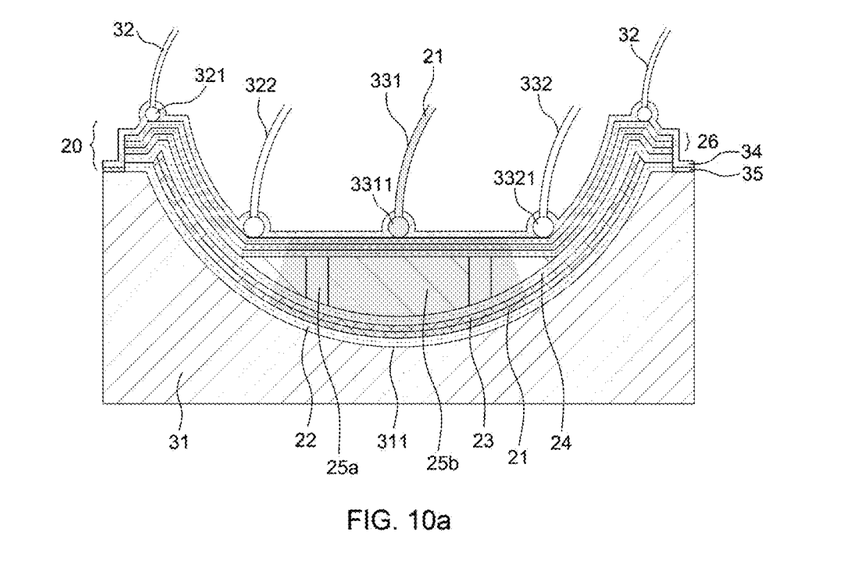
FIGS. 10a and 10b are schematic sectional views of a method for manufacturing an integrated hull according to an embodiment of the present disclosure, showing that a three-dimensional vacuum infusion process is executed.
Figure 10B:
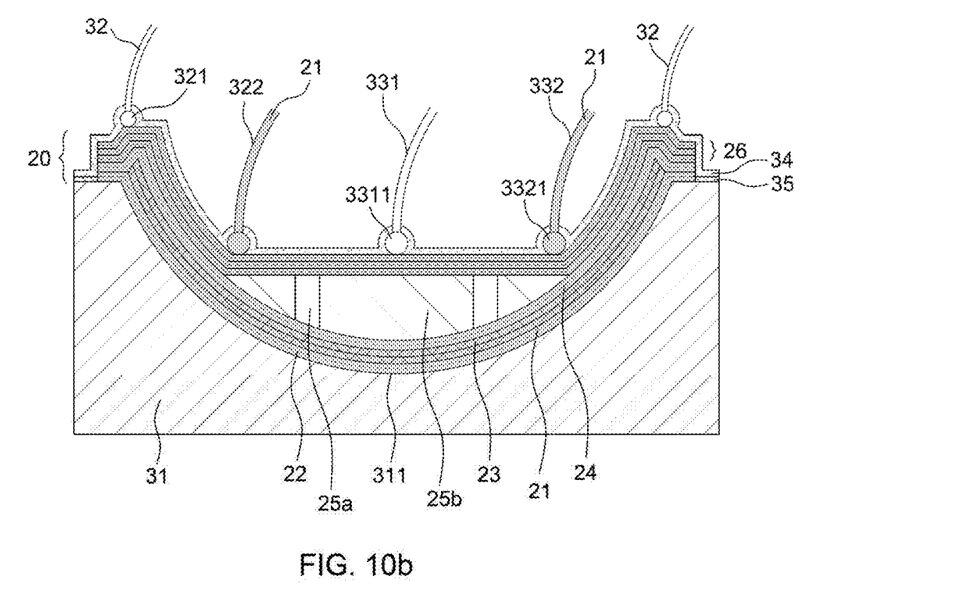
Figure 10C:
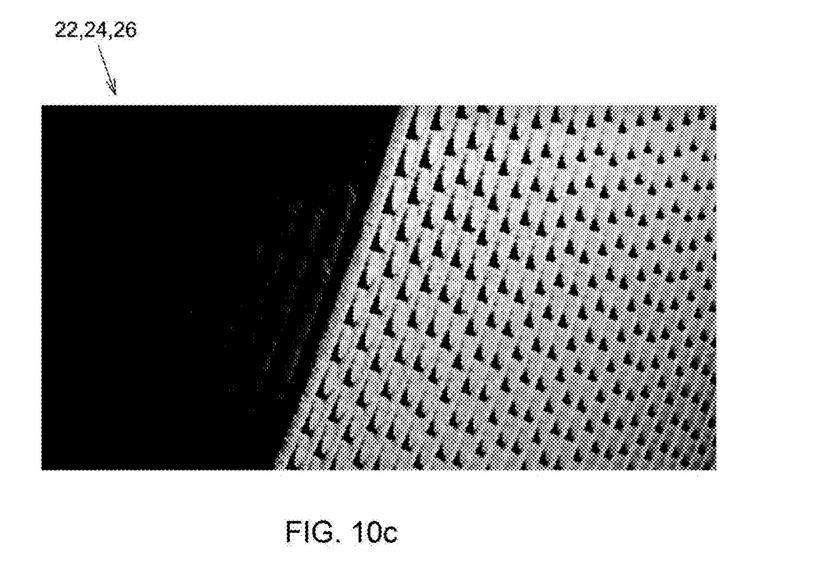
FIG. 10c is a partial perspective sectional view of first to third fiber clothes according to an embodiment of the present disclosure.

Please refer to FIGS. 10a and 10b. In step S16, the three-dimensional vacuum infusion process is executed, wherein: the vacuum pipes 32 are used to generate a vacuum suction force on the two sides of the mold 31, and the first and second resin pipes 331, 332 are used to sequentially inject a resin 21 and fill the resin 21 in the internal space of the lamination 20. The injection holes 3311, 3321 of the first and second resin pipes 331, 332 can sequentially inject the resin 21 according to the resin flow status. For example, the first resin pipes 331 first inject the resin 21 and fill a part of internal space of the lamination 20 (as shown in FIG. 10a), and then the second resin pipes 332 inject the resin 21 and fill the remaining internal space of the lamination 20 (as shown in FIG. 10b) to avoid the occurrence of dry spots in the lamination 20. During an injection process of the resin 21, the gelation status and temperature of the resin 21 are monitored to calculate the resin flow status of subsequently injected resin. In addition, please refer to FIG. 10c, when the vacuum suction force is generated on the two sides of the mold 31 by the vacuum pipes 32, the first fiber cloth 22, the second fiber cloth 24 and the third fiber clothes 26 adopted by the present disclosure still have internal space of three-dimensional structure, and the internal space have no compressed deformation due to the vacuum suction force. Therefore, the first fiber cloth 22, the second fiber cloth 24 and the third fiber clothes 26 have higher resin flow status.

In addition, before injecting the resin 21, the ratio of a hardener to a promoter can be determined according to the weather conditions of the day and the injection process, and the hardener and the promoter are added to the resin 21. For example, the resin 21 can use an unsaturated polyester resin (e.g., unsaturated polyester resin of Eternal Chemical Co.). The hardener can use Andonox products of united initiators Co., and the promoter can use Norox products of united initiators Co.

Figure 11:
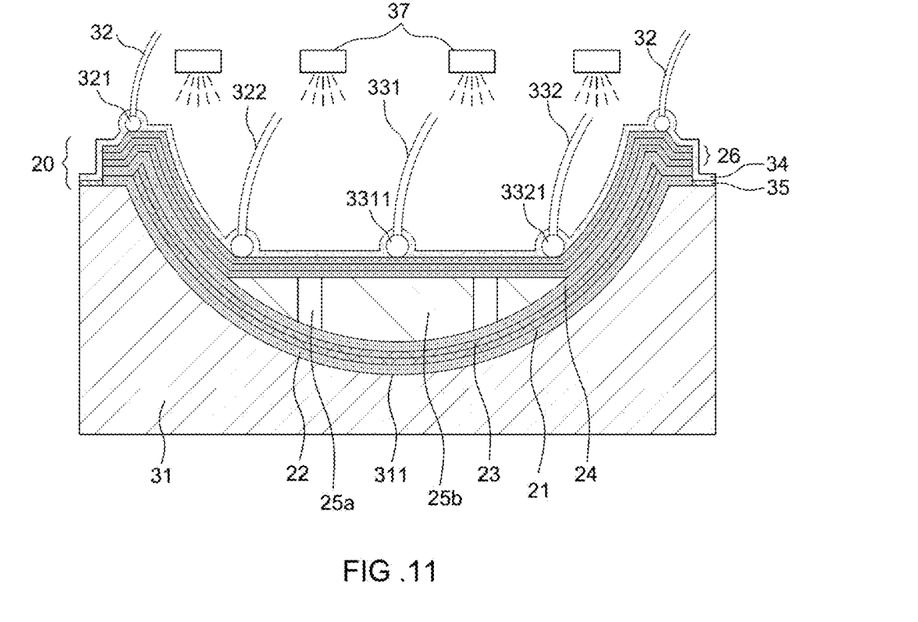
FIG. 11 is a schematic sectional view of a method for manufacturing an integrated hull according to an embodiment of the present disclosure, showing that a resin is cured.

Please refer to FIG. 11. In step S17, the resin 21 is cured, so as to form an integrated hull covering the longitudinal and transverse structural materials 25a, 25b. According to the curing process of the selected resin 21, it is decided to cure the resin 21 by natural curing, thermal curing, or irradiation with UV light. For example, a heating device 37 is provided to heat and cure the resin 21 to form the integrated hull that is integrated with the longitudinal and transverse structural materials 25a, 25b in one shot.

Figure 12:
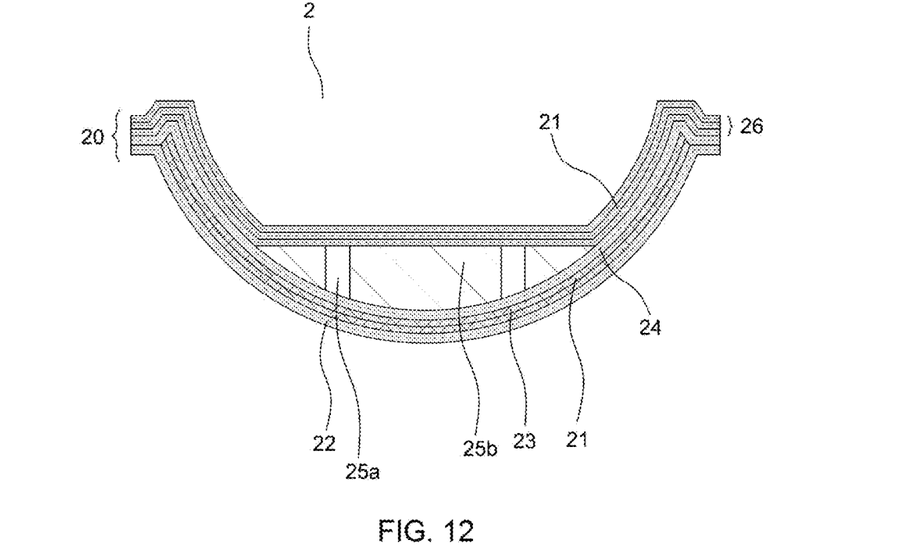
FIG. 12 is a schematic sectional view of a method for manufacturing an integrated hull according to an embodiment of the present disclosure, showing that a mold release process is executed.

Please refer to FIG. 12. In step S18, a mold release process is executed, wherein: the vacuum bag 34, the vacuum pipes 32, and the first and second resin pipes 331, 332 are removed respectively, and the integrated hull 2 is separated from the mold 31. More detailed, the integrated hull 2 of the present disclosure includes: at least one layer of first fiber cloth 22, at least one layer of core material 23 and at least one layer of second fiber cloth 24 that are stacked sequentially; longitudinal and transverse structural materials 25a, 25b that are deployed on the second fiber cloth 24; the third fiber clothes 26 that are stacked to cover the longitudinal and transverse structural materials 25a, 25b and a part of the second fiber cloth 24, whereby the first fiber cloth 22, the core material 23, the second fiber cloth 24 and the third fiber clothes 26 are formed to a lamination 20, wherein the first fiber cloth 22, the second fiber cloth and the third fiber clothes have internal space of three-dimensional structure; and a resin 21 that is filled in the internal space of the lamination 20, so as to form the integrated hull 2 that is integrated with the longitudinal and transverse structural materials 25a, 25b in one shot. The integrated hull 2 can be a boat hull, e.g., yacht hull.

In addition, the present disclosure further provides an apparatus for manufacturing an integrated hull by using three-dimensional structure type fiber clothes and a three-dimensional vacuum infusion process. The apparatus includes: a mold, wherein at least one layer of first fiber cloth, at least one layer of core material and at least one layer of second fiber cloth are stacked sequentially on the surface of a cavity of the mold, longitudinal and transverse structural materials are deployed on the second fiber cloth, the third fiber clothes are stacked to cover the longitudinal and transverse structural materials and a part of the second fiber cloth, whereby the first fiber cloth, the core material, the second fiber cloth and the third fiber clothes are formed to a lamination, wherein the first fiber cloth, the core material, the second fiber cloth and the third fiber clothes are three-dimensional structure type fiber clothes and have internal space of three-dimensional structure; vacuum pipes, wherein suction holes of the vacuum pipes are deployed at positions of two sides of the mold; first and second resin pipes, wherein injection holes of the first resin pipes are deployed at a middle position of the mold, and injection holes of the second resin pipes are deployed between the injection holes of the first resin pipes and the suction holes of the vacuum pipes; a layer of vacuum bag deployed on the lamination and covering the first and second resin pipes and the vacuum pipe, wherein a laying range of the vacuum bag can completely cover a laying range of the third fiber clothes and seal the mold; and a three-dimensional vacuum infusion device, wherein the vacuum pipes are used to generate a vacuum suction force on the two sides of the mold, and the first and second resin pipes are used to sequentially inject a resin and fill the resin in the internal space of the lamination, the resin is cured, so as to form an integrated hull that is integrated with the longitudinal and transverse structural materials in one shot.

The present disclosure is characterized in that: the three-dimensional vacuum infusion process of the manufacturing method of the integrated hull of the present disclosure is to use the pressure difference between the atmosphere and the vacuum to allow the resin to flow into the mold, fill the internal space of the lamination, and cover the longitudinal and transverse structural materials, thereby greatly avoiding the volatilization of volatile organic compounds in the conventional hand lay-up process; moreover, the present disclosure can increase the fiber content, reduce the amount of resin, and then reduce the weight. Compared with the conventional manufacturing method of the boat hull, which still adopts the hand lay-up process (the structural materials are bonded on the boat hull body by the secondary bonding manner) after the vacuum infusion process, the manufacturing method of the integrated hull of the present disclosure can avoid the secondary bonding manner of the structural material, thereby avoiding the risk of bond failure of the structural material and the poor structural performance of a boat hull, and can shorten the production period.

Compared with the conventional manufacturing method of the boat hull, which still adopts the hand lay-up process has: First, the manufacturing process greatly reduces the volatilization of organic solvents by about 85%, and reduces environmental pollution. Second, the longitudinal and transverse structural materials of the integrated hull are integrally formed by the vacuum infusion, and the integrated hull can increase the structural strength by about 40%. Third, the longitudinal and transverse structural materials of the integrated hull that are integrally formed by the vacuum infusion can reduce the chance of the secondary bonding, thereby reducing the weight of the finished boat hull product by about 8%. Fourth, the original materials (e.g., fiber clothes and core material) of the manufacturing method are deployed together with the structural materials to form a vacuum infusion, so surface materials (e.g., fiber clothes) and core material can be perfectly bonded. Fifth, according to the resin flow status and the pipe arrangement, the fiber content of the finished boat shell can be increased to about 65%. Sixth, the automatic three-dimensional vacuum infusion device monitors all parameters throughout the vacuum infusion process, to ensure stable high-quality finished boat shell products.

In conclusion, it is only a description of preferred implementations or embodiments of the technical means adopted by the present disclosure to resolve the problem, and are not intended to limit the scope of patent implementation of the present disclosure. That is, all variations and modifications that are consistent with the meaning of the scope of the claims of the present disclosure, or made according to the scope of the claims of the present disclosure, are covered by the scope of the claims of the present disclosure.

What is claimed is:

1. A method for manufacturing an integrated hull by using three-dimensional structure fiber cloths and a three-dimensional vacuum infusion process, the method comprising the steps of:

providing a mold, comprising a cavity;

sequentially stacking at least one layer of first fiber cloth, at least one layer of core material and at least one layer of second fiber cloth on a surface of the cavity of the mold;

deploying longitudinal and transverse structural materials on the at least one layer of second fiber cloth;

stacking a plurality of layers of third fiber cloths to cover the longitudinal and transverse structural materials and a part of the at least one layer of second fiber cloth, whereby the at least one layer of first fiber cloth, the at least one layer of core material, the at least one layer of second fiber cloth and the plurality of layers of third fiber cloths are stacked to form a lamination, wherein the at least one layer of first fiber cloth, the at least one layer of second fiber cloth and the plurality of layers of third fiber cloths are the three-dimensional structure fiber cloths and have an internal space of three-dimensional structure;

determining a pipe arrangement of a plurality of vacuum pipes and a plurality of first resin pipes and a plurality of second resin pipes according to the lamination design and a resin flow status, wherein suction holes of the plurality of vacuum pipes are deployed at positions of two sides of the mold, injection holes of the plurality of first resin pipes are deployed at a middle position of the mold, and injection holes of the plurality of second resin pipes are deployed between the injection holes of the plurality of first resin pipes and the suction holes of the plurality of vacuum pipes;

deploying a layer of vacuum bag on the lamination and covering the plurality of first resin pipes and plurality of second resin pipes and the plurality of vacuum pipes, wherein the vacuum bag completely covers the plurality layers of the third fiber cloths and seals the mold;

executing the three-dimensional vacuum infusion process, wherein: the plurality of vacuum pipes are used to generate a vacuum suction force on the two sides of the mold, and the plurality of first resin pipes and plurality of second resin pipes are used to sequentially inject a resin and fill the resin in the an internal space of the lamination;

curing the resin, so as to form an integrated hull that is integrated with the longitudinal and transverse structural materials in one shot; and executing a mold release process, wherein: the vacuum bag, the plurality of vacuum pipes, and the plurality of first resin pipes and plurality of second resin pipes are removed respectively, and the integrated hull is separated from the mold;

wherein the longitudinal structural materials and transverse structural materials are a configuration design of longitudinal beams and transverse beams, and the longitudinal structural materials and transverse structural materials are made of polyurethane (PU) foam material; and wherein the plurality of first resin pipes first inject the resin and fill a part of the internal space of the lamination, which is located at a middle area of the lamination, and then the plurality of second resin pipes inject the resin and fill the remaining internal space of the lamination, which is located at two side areas beside the middle area of the lamination, whereby there is not any dry spot in the lamination at the middle area, wherein the middle area includes the longitudinal structural materials and transverse structural materials made of polyurethane (PU) foam material.

2. The method for manufacturing an integrated hull by using three-dimensional structure fiber cloths and a three-dimensional vacuum infusion process according to claim 1, wherein the pipe arrangement is such that the suction holes of the plurality of vacuum pipes connect to the internal space of the lamination to provide the vacuum suction force, and the injection holes of the plurality of first resin pipes and the plurality of second resin pipes connect to the internal space of the lamination, whereby the first resin pipes and the plurality of second resin pipes sequentially inject the resin.

3. The method for manufacturing an integrated hull by using three-dimensional structure fiber cloths and a three-dimensional vacuum infusion process according to claim 2, wherein when the vacuum suction force is generated on the two sides of the mold by the plurality of vacuum pipes, the at least one layer of first fiber cloth, the at least one layer of second fiber cloth and the plurality of layers of third fiber cloths still have internal space of three-dimensional structure.

4. The method for manufacturing an integrated hull by using three-dimensional structure fiber cloths and a three-dimensional vacuum infusion process according to claim 1, the method further comprising the step of:

before the step of deploying the vacuum bag, deploying a vacuum consumable layer on the plurality of layers of third fiber cloths and covering the plurality of layers of the third fiber cloths.

5. The method for manufacturing an integrated hull by using three-dimensional structure fiber cloths and a three-dimensional vacuum infusion process according to claim 4, wherein the vacuum consumable layer comprises peel ply, release film and flow mesh.

* * * * *